(12) United States Patent
Li et al.

(10) Patent No.: US 7,515,772 B2
(45) Date of Patent: Apr. 7, 2009

(54) DOCUMENT REGISTRATION AND SKEW DETECTION SYSTEM

(76) Inventors: Xing Li, 9 Jewelberry Dr., Webster, NY (US) 14580; Terri A. Clingerman, 1855 Route 21 N., Palmyra, NY (US) 14522

( * ) Notice: Subject to any disclaimer, the term of this patent is extended or adjusted under 35 U.S.C. 154(b) by 456 days.

(21) Appl. No.: 11/028,394

(22) Filed: Jan. 3, 2005

(65) Prior Publication Data
US 2006/0039629 A1 Feb. 23, 2006

Related U.S. Application Data

(63) Continuation-in-part of application No. 10/943,310, filed on Sep. 17, 2004, now Pat. No. 7,200,285, and a continuation-in-part of application No. 10/923,388, filed on Aug. 21, 2004.

(51) Int. Cl.
*G06K 9/36* (2006.01)
(52) U.S. Cl. .................. 382/289; 358/2.1; 358/462; 358/474; 358/505; 382/176; 382/199; 382/293
(58) Field of Classification Search .............. 358/1.2, 358/1.9, 1.15, 3.26, 488, 474, 2.1, 462, 505; 382/165, 199, 266, 289, 291, 299, 176, 293
See application file for complete search history.

(56) References Cited

U.S. PATENT DOCUMENTS

| | | | |
|---|---|---|---|
| 4,577,235 A * | 3/1986 | Kannapell et al. ............ 358/462 |
| 5,245,676 A | 9/1993 | Spitz |
| 5,323,473 A * | 6/1994 | Lau ............................. 382/175 |
| 5,355,420 A | 10/1994 | Bloomberg et al. |
| 5,442,459 A * | 8/1995 | Gahang ................... 358/426.02 |
| 5,491,759 A * | 2/1996 | Nagao et al. ................. 382/199 |
| 5,528,387 A | 6/1996 | Kelly et al. |
| 5,647,026 A * | 7/1997 | Kwarta ....................... 382/270 |
| 5,697,609 A | 12/1997 | Williams et al. |
| 5,748,344 A | 5/1998 | Rees |
| 5,818,976 A * | 10/1998 | Pasco et al. .................. 382/289 |
| 6,005,680 A * | 12/1999 | Luther et al. ................. 358/2.1 |
| 6,064,778 A * | 5/2000 | Pasco et al. .................. 382/289 |
| 6,137,989 A | 10/2000 | Quesnel |
| 6,310,984 B2 | 10/2001 | Sansom-Wai et al. |
| 6,430,320 B1 | 8/2002 | Jia et al. |
| 6,621,599 B1 | 9/2003 | Newell |
| 6,674,899 B2 | 1/2004 | Nagarajan |
| 6,741,741 B2 | 5/2004 | Farrell |
| 6,744,536 B2 | 6/2004 | Buchar et al. |
| 6,912,325 B2 * | 6/2005 | Rombola et al. ............. 382/289 |
| 6,954,290 B1 * | 10/2005 | Braudaway et al. ......... 358/488 |
| 7,120,314 B2 * | 10/2006 | Schweid et al. ............. 382/289 |
| 7,133,573 B2 * | 11/2006 | Brugger et al. .............. 382/289 |
| 7,336,404 B2 * | 2/2008 | Benham ...................... 358/488 |
| 2001/0014183 A1 * | 8/2001 | Sansom-Wai et al. ........ 382/289 |
| 2001/0022675 A1 * | 9/2001 | Kelly et al. .................. 358/488 |
| 2002/0136451 A1 * | 9/2002 | Dolan et al. ................. 382/165 |
| 2003/0035155 A1 * | 2/2003 | Chen ........................... 358/504 |
| 2003/0035593 A1 * | 2/2003 | Rombola et al. ............. 382/289 |
| 2003/0118232 A1 | 6/2003 | Li et al. |
| 2004/0047515 A1 * | 3/2004 | Chiu ........................... 382/274 |

(Continued)

*Primary Examiner*—Gregory M Desire
(74) *Attorney, Agent, or Firm*—Michelle Waites

(57) ABSTRACT

Disclosed methods and systems perform electronic registration of digitally captured images in real-time and performs accurate and robust digital image processing by analyzing the entire digitally captured image.

12 Claims, 10 Drawing Sheets

U.S. PATENT DOCUMENTS

| | | | |
|---|---|---|---|
| 2004/0114147 A1* | 6/2004 | Yeoh et al. | 356/450 |
| 2004/0151402 A1* | 8/2004 | Sugimoto | 382/305 |
| 2004/0160645 A1* | 8/2004 | Nonaka et al. | 358/479 |
| 2004/0190023 A1* | 9/2004 | Aoyama | 358/1.9 |
| 2004/0212853 A1* | 10/2004 | Kelly et al. | 358/488 |
| 2004/0263915 A1* | 12/2004 | Park | 358/461 |
| 2006/0039629 A1* | 2/2006 | Li et al. | 382/289 |
| 2006/0098243 A1* | 5/2006 | Ahmed et al. | 358/474 |

* cited by examiner

FIG. 7

DOCUMENT REGISTRATION AND SKEW DETECTION SYSTEM

This is a continuation in part application of co-pending U.S. patent application Ser. No. 10/923,388 Entitled "Real-Time Processing of Grayscale Image Data" filed Aug. 21, 2004 and U.S. patent application Ser. No. 10/943,310 Entitled "Document Registration and Skew Detection System," filed Sep. 17, 2004 now U.S. Pat. No. 7,200,285 both assigned to the present assignee.

TECHNOLOGY

Illustrated herein, generally, are systems and methods for processing scanned image data to provide proper alignment of a scanned document and more particularly, to real-time processing of grayscale image data to compensate for erroneous input document registration.

BACKGROUND

In the reproduction of digital data obtained, for example, by electronically scanning an input document, it is often desirable to perform electronic registration, deskew, masking, automatic magnification other useful image processing operations. Many of these operations require precise location of the borders of the document. In other words, these features cannot be performed unless one or more of the edges of the document are first detected by the scanning system.

Digital scanners are commonly used to capture images from hardcopy media. In a typical scanning operation, the surface of an input document is illuminated as an image sensor moves past the document detecting the intensity of light reflected from each location. These analog light intensity values are subsequently stored at corresponding pixel locations as proportionate electrical charges, which are collectively passed to an image processor where they are quantized to grayscale levels. Each grayscale level is represented by a multi-bit digital value that has a number of bits that is determined by the number of intensity levels that can be generated by the scanner. For example, in a scanner that represents grayscale levels using 8 bit words will be able to capture 256 ($2^8$) different intensity levels. The grayscale value for the level that provides the closest match to the intensity of light reflected from each location is assigned to the corresponding pixel. Thus, scanning captures analog input images by generating a stream of multi-bit values, with each location in the image being represented by a multi-bit digital word.

One or more scanners, printers, video displays and/or computer storage devices are often connected via a communications network to provide a digital reproduction system. For example, a digital copier may incorporate a scanner and a digital printer. While scanners capture hundreds of light intensity levels, digital output devices usually generate relatively few levels of output. For example, digital printers typically process binary output, for which a single bit is assigned to each pixel. During printing, marking material is either applied to or withheld from the pixel depending upon the assigned value. In a system with a digital printer and scanner, the grayscale data generated by the image capture device is usually rendered to binary format and stored in memory, from which it is subsequently retrieved by the output device. While it is possible to print data as it is rendered, storing it first provides several advantages. For one, when the data is stored, it is possible to print multiple copies of the same page without having to repeatedly re-scan the input document. It is also easier to transfer stored data between devices, as it can be compressed and decompressed.

Grayscale image data is often processed for improved image quality. In order to avoid data loss, image processing is preferably applied before the image is rendered. Well known image processing techniques are performed to improve image contrast, sharpness and color, to eliminate scanning artifacts, hole punches and other undesirable data and for many other reasons.

Most systems that digitally reproduce images use mechanical systems to properly align the document as it is transported to the scanning area. While mechanical systems and methods are useful, they cannot typically place the document in perfect alignment position on the scanning surface before it is captured by the scanner. As such, electronic systems and methods are employed to apply the fine tuning that is required to accurately align the image.

For example, "skew" may be introduced when an input document becomes rotated relative to the image sensor before it is captured. Skew correction is a well known imaging process that eliminates skew by determining the magnitude and direction of the document rotation relative to a document edge and applying a corresponding counter rotation to the image data.

Cropping, another well known imaging process, is performed to remove extraneous data, such as image data that represents the document transport, scanner platen and other hardware that is present in the scanning when the document is digitally captured. In a typical cropping operation, the size of the document is determined and is its location inside the scan. The data that lies outside of the identified region is then removed before the image is printed.

One-pass scanners process image data "on-the-fly," i.e., the grayscale data is generated, processed and rendered in real-time. An accurate and robust digital image processing technique analyzes the entire scan to select the data that is most relevant for processing. However, one-pass scanners typically store a subset of the scanned data for use in image processing operations. For example, some systems detect document edges by finding the extreme points of the document on the scanned page. Others determine the skew angle and/or registration point based upon small segments of identified document edges. As these decisions are based on very limited amount of information, the results produced by these approaches are often unreliable.

It is therefore, beneficial to provide a system and method for processing a grayscale image in real-time based upon an analysis of an entire scan.

PRIOR ART

U.S. Pat. No. 5,245,676, discloses calculating skew angle by choosing pixel color transitions, selecting an alignment, determining the locations of pixel color transition points for the selected alignment; and calculating the power of the alignment from the locations of the pixel color transition points.

U.S. Pat. No. 5,528,387 discloses a system for electronically registering an image on an input document. The system detects the corners and center of the leading edge of the document being scanned; calculates the skew angle of the document; and rotates the electronic representation of the input image based on the calculated skew angle.

U.S. Pat. No. 6,310,984 describes a method of automatically determining a skew angle of a scanned document by defining left and right image boundaries for groups of scanlines; digitally forming edge segments by extending image boundaries between successive groups of scanlines; and calculating a slope of all of the digitally formed edge segments that are longer than a predetermined length.

U.S. Pat. No. 6,741,741 discloses detecting document edges by scanning a portion of the document against a substantially light reflecting backing and then against a substantially light absorbing backing document edges are detected by comparing the data from the two scans.

SUMMARY

Aspects disclosed herein include a digital imaging system that includes a digital image capture device configured to generate a scan image that digitally represents an input document positioned in a scan area; an image processor configured to receive and process the scan image in real-time, wherein the image processor includes an input document edge detection system, an input document corner detection system, an input document skew calculation system and an input document shear calculation system; and an output processor configured to provide registration information for the input document.

In one aspect, a method includes generating a digital representation of a scan image that represents an input document positioned in a scan area; identifying pixels of the scan image that correspond to a first captured portion of the input document; detecting scan image scanlines that correspond to a plurality of input document edges; and generating registration information for the input document reproduction based upon at least one of the input document skew angle and the input document shear.

In another aspect, a method includes receiving a scan image that digitally represents an input document positioned in a scan area; and detecting a fast-scan direction aligned input document edge by (i) obtaining a first grayscale average for a scan image target pixel and a pixel aligned with the target pixel in a slow-scan direction in a first previously processed scanline, (ii) obtaining a second grayscale average for pixels that are aligned with the target pixel in a slow-scan direction in at least a secondhand third previously processed scanline, (iii) obtaining a difference between the first grayscale average and the second grayscale average; (iv) obtaining a grayscale difference threshold that distinguishes background pixels and input document pixels and (v) designating the target pixel as a slow-scan transition pixel if the target and processed grayscale average difference exceeds the grayscale difference threshold.

BRIEF DESCRIPTION OF THE DRAWINGS

FIG. 7 is an illustration showing an example of how image data may be sampled in accordance with present systems and methods;

DETAILED DESCRIPTION

Figure 1:
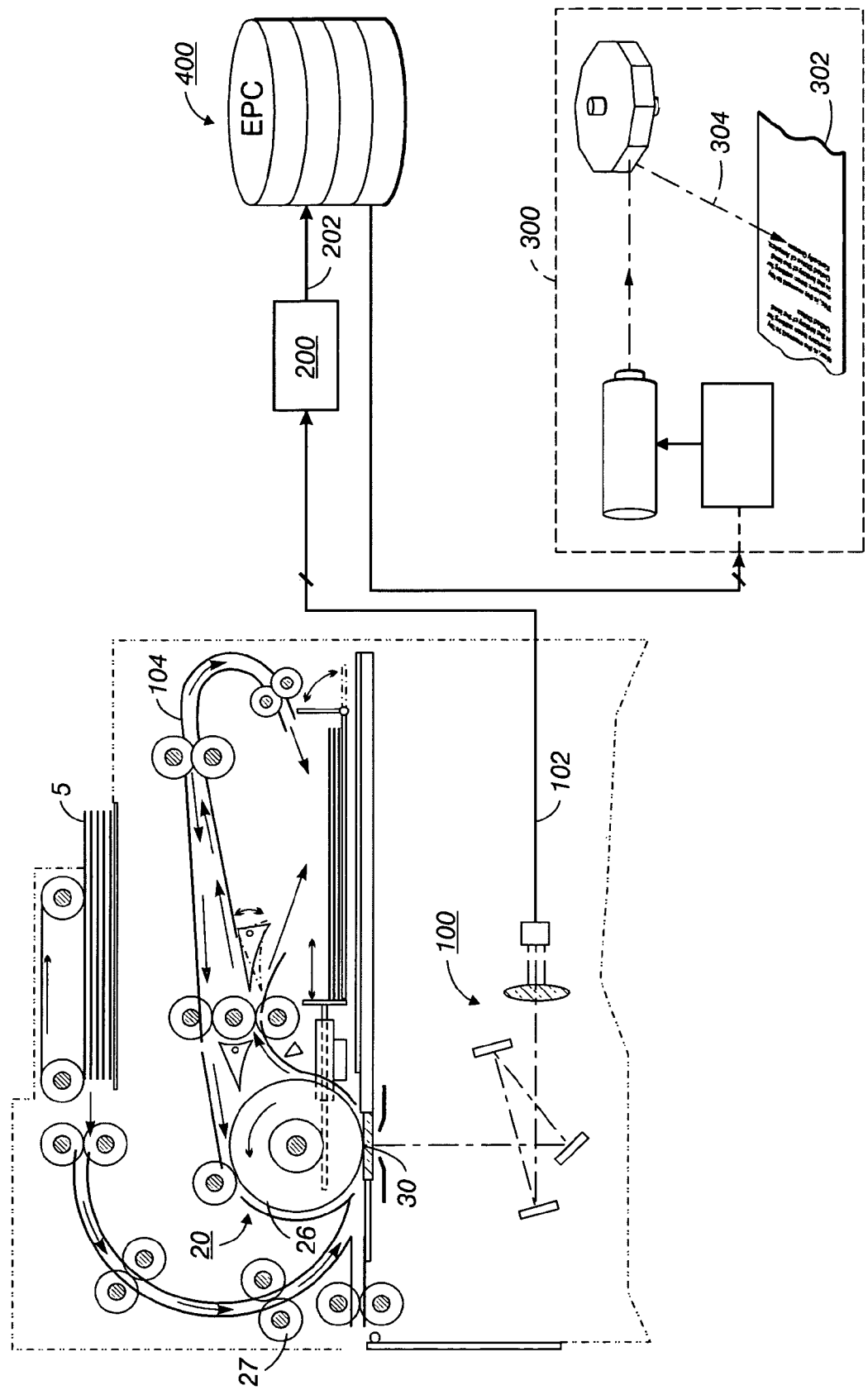
FIG. 1 provides one example of a system for digitally reproducing hardcopy images.

For a general understanding of the present system and method, reference is made to the drawings. In the drawings, like reference numerals have been used throughout to designate identical elements. In describing the present system and method, the following term(s) have been used in the description:

A "document" is any substance that is capable of displaying image data. As used herein, an "input document" is a hardcopy document that bears the image that is being or has been presented for digital capture.

A "digital image capture device" is a device that captures analog images and converts them to digital format. In particular, a "raster input scanner," also referred to as a "RIS" or a "scanner" captures analog images from input documents and converts them to digital format. A scanner includes any such device, whether flat-bed, hand-held, feed-in, and includes devices that capture images in color or only in black-and-white.

The "slow-scan direction" refers to the photoreceptor process direction, which is typically, but not necessarily, the same as the document transport direction. The "fast-scan direction" refers to the direction normal to the slow-scan direction.

A "pixel" refers to an image signal having a density between white (i.e., 0) and black (i.e., the maximum available intensity value) that is associated with a particular position in an image. Accordingly, pixels are defined by intensity and position. The term "pixel" refers to such an image signal in a single separation. A "color pixel" is the sum of the color densities of corresponding pixels in each separation. A "target pixel" is a pixel that is the referenced subject of a given operation, task or function.

A "scanline" is the set of pixels that is captured in a single sweep of the image in the fast-scan direction. A "pixel column" refers to the set of pixels that are located in the same fast-scan position of separate scanlines.

The "scan area" and "scanning surface" refer to the surface that supports the input document during scanning. A "scan image" is a digital representation of a scan area entire, which typically includes data that represents both the input document and scanner backing.

"Electronically linked" means configured to communicate digital information.

"Data" refers to physical signals that indicate or include information and includes information that exists in any physical form. For example, data could exist as electromagnetic or other transmitted signals, it could exist as signals that are stored in electronic, magnetic, or other form, and it may be information that is transitory or is in the process of being stored or transmitted. Data is typically processed by a set of instructions, such as a software program or application, to generate output.

Data that is processed in "real-time" is processed as it is received.

"Gray level" refers to one among several available increments of image intensity that vary between a minimum value and a maximum, regardless of the color of the separation in which one or more of the levels may be found. The term "gray" does not refer to a color unless specifically identified as such.

A "grayscale value" is a numerical value that indicates the optical density of an image at a given pixel.

An "image" is generally a pattern of physical light that may include characters, words, and text as well as other features such as graphics. An entire image is typically represented by a plurality of pixels arranged in scanlines.

"Image data" refers to information that represents an image. "Input image data" is image data that is delivered to a system or device by an external source. "Grayscale image data" refers to image data that represents and black and white and/or color images that have multiple luminance levels, with each pixel defined at a single optical density.

"Image processing" generally refers to one or more operations that are performed to modify an image.

"Registration" refers to the positioning of an input document in a scan area for scanning. "Registration information" generally refers to information relating to the positioning of an input document relative to a reference line in the scan area.

"Skew" refers to distortion that results from rotation of an input image relative to the image sensor or other identified reference point. "Skew angle" is the angular displacement of a location relative to a reference resulting from the introduction of skew. "Skew amount" refers to the magnitude of the skew angle.

"Shear" refers to distortion in an image that results from translation of an input image relative to the image sensor or other identified reference point. "Shear amnout" refers to the magnitude of the translation.

An "edge" refers to the boundary of an input document. Generally, the "lead edge" and "trail edge" of a document are aligned normal to the transport direction, while the "left edge" and "right edge" are aligned parallel to the transport direction. The "lead edge" is the first edge of the document to move past the image sensor and the "trail edge" is the last edge of the document to move past the image sensor.

"Background-to-medium transition points" are pixels in a scanned grayscale image that lie at the border between the input document and the remainder of the scan area.

Generally, digital reproduction systems include an image source, which provides grayscale data that represents an input image; an image processor, which performs various image modifications and stores the processed data in an electronic pre-collation memory; and an output device, which retrieves the data from electronic pre-collation memory and displays it in a viewable format. FIG. 1 provides an illustration of such a digital reproduction system 10. In the illustrated system 10, the image source is a raster input scanner (RIS) 100 and the output device is a xerographic digital printer 300. System 10 scans input documents 5 line-by-line, detecting the intensity of light reflected from each discrete location and storing it as a proportionate electrical charge in a corresponding pixel location. The digitized representation of input document 5 can then be transmitted to permanent or removable storage, transmitted to an external device, printed or made available some other digital output device. If the image will be printed, grayscale image data 102 is typically rendered to binary format and stored in electronic pre-collation memory (EPC) for retrieval be a printer 300.

High speed systems 10 typically use an automated document handler or other mechanically controlled device to transport an input document 5 to a scanning surface 108 for capture by RIS 100. Many of high speed systems 10 require use mechanical hardware to physically align input document 5 with fast-scan direction X. While mechanical devices are useful for many purposes, they typically do not operate quickly enough to be used in a system 10 that incorporates a high speed RIS 100. In the example of FIG. 1, a constant velocity transport ("CVT") system 104 is used to transport an input document 5 to scanning surface 108. While system 10 is shown here as having document 5 transported in slow-scan direction Y and positioned with its lead and trail edges parallel to fast-scan direction X, it is understood that documents 5 may be transported and/or aligned in any direction.

Present systems and methods use electronic registration techniques to accurately position digitally captured images for output. Rather than engage in the time consuming process of physically aligning input document 5 prior to image capture, electronic registration systems adjust the spatial coordinates of the captured grayscale image data 102 to properly align the output image for display.

A conventional CVT 104 includes use a backing roll 106 with a reflectance that enables RIS 100 to easily distinguish backing roll 106 from that of input document 5. For example, office documents are typically printed on white paper, which typically has a brightness between 84 and 100. Accordingly, the color of backing roll 106 is typically selected such that document 5 can be easily detected by RIS 100 when it is positioned in front of backing roll 106. For illustration purposes, present systems and methods are hereinafter described with reference to a white input document 5 and a black backing roll 106. It is understood, however, that a typical RIS 100 will be able to distinguish backing rolls 106 and/or documents 5 that are provided in other colors.

While the goal is usually to scan only input document 5, RIS 100 will typically generate a scan image 20 that represents an input document 5 positioned on scanning surface 108. In other words, scan image 20 will include grayscale image data 102 that represents both input document 5 and backing roll 106. Accordingly, edge detection processes typically search for grayscale image data 102 that lies in the transition regions 30 (shown in FIGS. 5 and 10) between input document 5 and backing roll 106. Pixels in transition regions 30 can be identified at locations where adjacent pixels have sufficiently distinct gray scale values. In the example described above, edges could be detected by identifying locations where a pixel with a grayscale value equal to 0 is next to a pixel with a grayscale value equal to 255.

To reproduce input documents 5, the image data is retrieved from storage is typically subjected to cropping and/or other image editing operations to remove the grayscale data that represents backing roll 106. In the case of a printed image, binary image data is delivered to printer 300 as a continuous stream of electronic signals that modulate a light beam 304 to selectively discharge the surface of a uniformly charged imaging member 302. Toner material 306 that is brought in contact with imaging member 302 adheres to the remaining charged areas. The toner developed image is then transferred to a copy sheet and permanently fixed thereto. Accordingly, the binary data retrieved from EPC 350, which represents document image 18, is transformed to markings that are printed on the output copy sheet. Notably, while system 10 is described as having image data that is retrieved from storage, it is understood that it is possible to reproduce images by transmitting the image data directly .to the output device or by any other appropriate delivery method.

Figure 2:
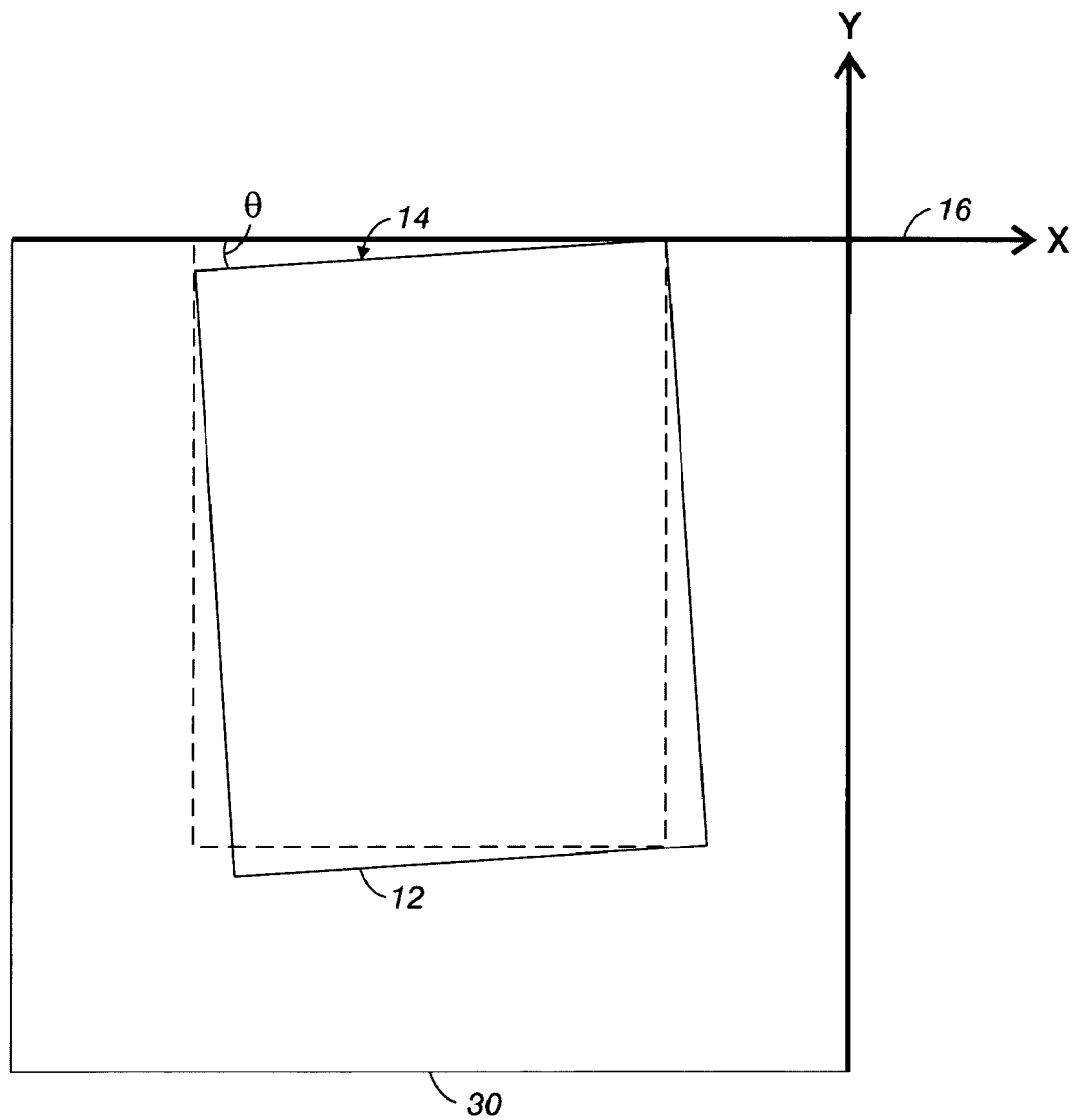
FIG. 2 is a simplified diagram showing the basic elements of a raster input scanner.

Turning to FIG. 2, in the example described herein, RIS 100 has a scanning surface 108 with a slow-scan direction corresponding to document transport direction Y and a fast-scan direction X, normal to transport direction Y. Ideally, the Lead Edge 12 of input document 5 will be on positioned scanning surface 108 in perfect parallel alignment with axis X prior to image capture. However, if document 5 is not properly aligned or it becomes misaligned before it is scanned, Lead Edge 12 will instead form an angle $\Theta$ with axis X. In other words, the spatial coordinates for the pixels that that form document image 18 will be skewed by an angle Θ with respect to the corresponding locations of document 5. Scan image 20 is typically subjected to image processing to eliminate the skew in order to provide an accurate reproduction of input document 5.

Figure 3:
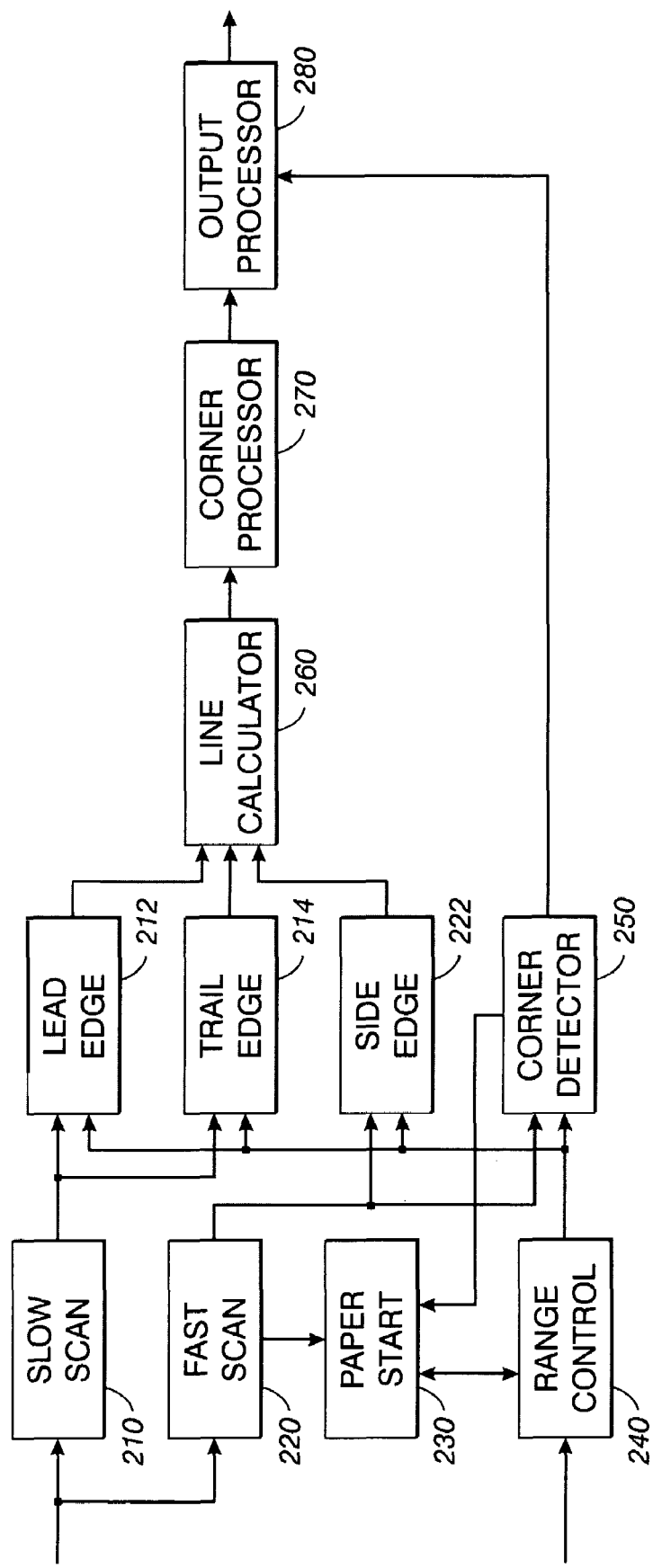
FIG. 3 is a block diagram showing an image processor that may be used to provide registration information in real-time using present systems and methods.

Turning to FIG. 3, in one aspect, IP 200 includes a Slow Scan Processor 210 and Fast Scan Processor 220, which process scan image 20 to locate the pixels corresponding to Lead Edge 12, Trail Edge 14, Left Edge 22 and Right Edge 24. More specifically, Lead Edge Detector 212 and Trail Edge Detector 214 record output generated by Slow Scan Processor 210 to identify the pixels that represent Lead Edge 12 and Trail Edge 14. Similarly, Side Edge Detector 222 records output generated by Fast Scan Processor 220 to identify the pixels that represent Left Edge 22 and Right Edge 24.

One way to identify the corners of document image 18 is to locate the points where Lead Edge 12, Trail Edge 14, Left Edge 22 and Right Edge 24 intersect. That is, the corners 16 of document image 18 will be found at the pixels with coordinates that indicate that they are located on two of the identified edges. The output of Fast Scan Processor 220 can also be transmitted to Corner Detector 250 for an independent location of the corners of Lead Edge 12. Accordingly, IP 200 will be better equipped to detect skew and registration information for document image 18 if Lead Edge Detector 212, Trail Edge Detector 214 and/or Side Edge Detector 222 do not operate properly.

The output of Lead Edge Detector 212, Trail Edge Detector 214 and Side Edge Detector 222 are transmitted to Line Calculator 260, which calculates the skew and shear in the grayscale data that represents input document 5. Corner Processor 270 incorporates the skew and shear values are into final determination of the coordinates of corners 16. The edge and corner locations can be used for registration, cropping/edge masking and other editing operations.

Still referring to FIG. 3, IP 200 also includes a Paper Start Detector 230 and a Detection Range Controller 240. Generally, as RIS 100 captures scan image 20, Paper Start Detector 230 searches for Lead Edge 12. Detection Range Controller 240 can limit the image processing that is performed on scan image 20 to the scanlines that are likely to include the desired data. For example, in a search for Lead Edge 12, Detection Range Controller 240 can limit image processing to the first 100 scanlines of scan image 20.

The final skew, paper size and registration determinations are made by Output Processor 280, using the detected edges, corner locations, paper start and other available information. Again, corners 16 can be calculated based upon the intersections of the edges and they can be obtained from the information generated by Corner Detector 250. In one aspect, Output Processor 280 performs additional calculations to identify the data that is most reliable for the selected process (es). Output Processor 280 could also select data based upon a pre-programmed hierarchy or it could use default values in the event that the available information is incomplete or determined to be inaccurate.

Figure 4:
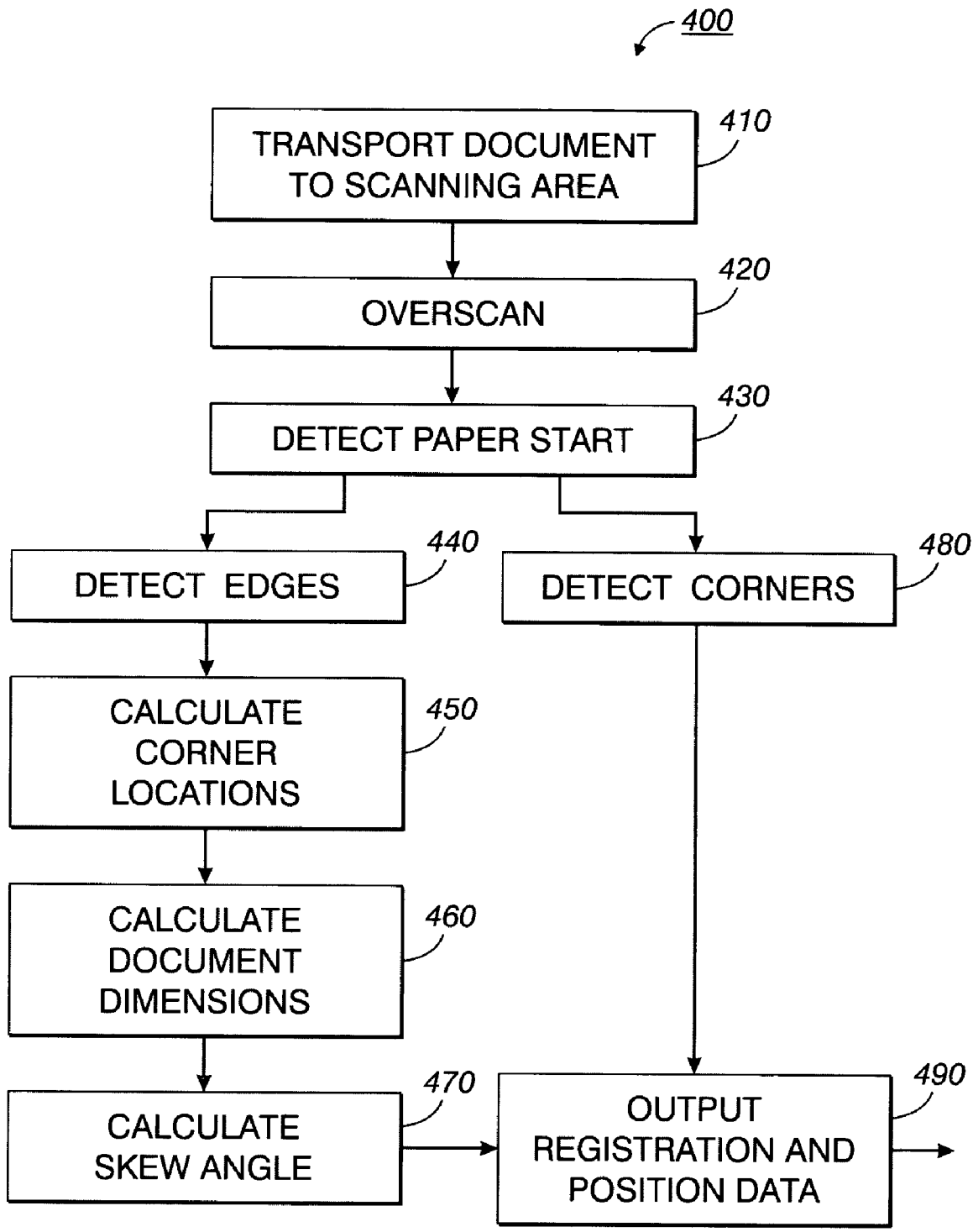
FIG. 4 is a block diagram showing electronic registration of a digitally captured image.

Turning to FIG. 4, a method 400 of electronically registering a digitally captured image for accurate reproduction includes transporting an input document 5 in slow-scan direction Y to scanning surface 108 as indicated at block 410 and overscanning input document 5 at block 420. As scan image 20 is captured, Paper Start Detector 230 searches each scanline and generates a paper start signal at block 430 when it detects the generation of document image 18. Lead Edge 12, Left Edge 22, Right Edge 24 and Trail Edge 14 of document image 18 are then identified at block 440.

The output of block 440 can be used to obtain the coordinates of corners 16 at block 450, the distance between parallel edges can be used to obtain the dimensions of document image 18 at block 460 and the slope of one or more of the identified edges can be used to obtain skew angle Θ at block 470. As explained in detail below, lead edge corners 16 can also be determined independently at block 480.

These output values are made available to Output Processor 280 at block 490 for a final determination of the skew angle, the position of document image 18 inside the captured scan and the appropriate output paper size. The edge and corner locations can then be made available to other parts of system 10 for cropping, masking and other image editing operations.

As stated above, Paper Start Detector 230 generates a signal when the top of document 5 has been captured at block 420. As also stated above, Lead Edge 12 will typically be found where there is a dramatic change in the grayscale values for adjacent pixels. In one aspect, Paper Start Detector 230 identifies the top of document 5 as soon as: (i) the number of pixels captured since the start of scanning that have relatively high grayscale values exceeds a predetermined threshold $t_1$, (ii) the number of pixels captured within a single line that have relatively high grayscale values exceeds a predetermined threshold $t_2$ or (iii) at least one corner 16 of Lead Edge 12 has been located. While the example above is described using white paper, which has a grayscale value of 255, and a black background, which has a grayscale value of 0, it is understood that the grayscale value needs only to be high enough to be distinguishable from the background and thus, the present systems and methods are not limited to using these grayscale values.

Detection Range Controller 240 may optionally combine this paper start signal with the output of Paper Start Detector 230 and the original document size (which is entered by the user), and other programmable parameters to limit the search for relevant image data as described above. More specifically, some digital reproduction systems require an original document to be re-scanned skew when the skew exceeds a predetermined amount, rather than attempt to electronically correct it. Thus, if the document being scanned is 12 inches wide and RIS 100 has a scanning resolution of 600 dpi (i.e., there are 7200 pixels per scanline), a system 10 that will not attempt to electronically correct skew that exceeds 15 milliradians will only apply a correction to an image that has its entire leading edge located within the first 108 scanned lines (7200 pixels× 0.015=108 pixels). Accordingly, Detection Range Controller 240 can limit the search for Lead Edge 12 to the first 108 scanlines that are captured after Paper Start Detector 230 generates the paper signal. Detection Range Controller 240 can also limit the search for Lead Edge 12 based upon the maximum rotation that can be applied to a document before it will become jammed in the paper path on the way to the scanning area.

Regardless of whether a Detection Range Controller 240 is provided, once document 5 is detected, Lead Edge 12, Left Edge 22, Right Edge 24 and Trail Edge 14 are identified at block 440. More specifically, Lead Edge 12 and Trail Edge 14 are identified by Slow Scan Processor 210 and Left Edge 22 and Right Edge 24 are identified by Fast Scan Processor 220.

Figure 5:
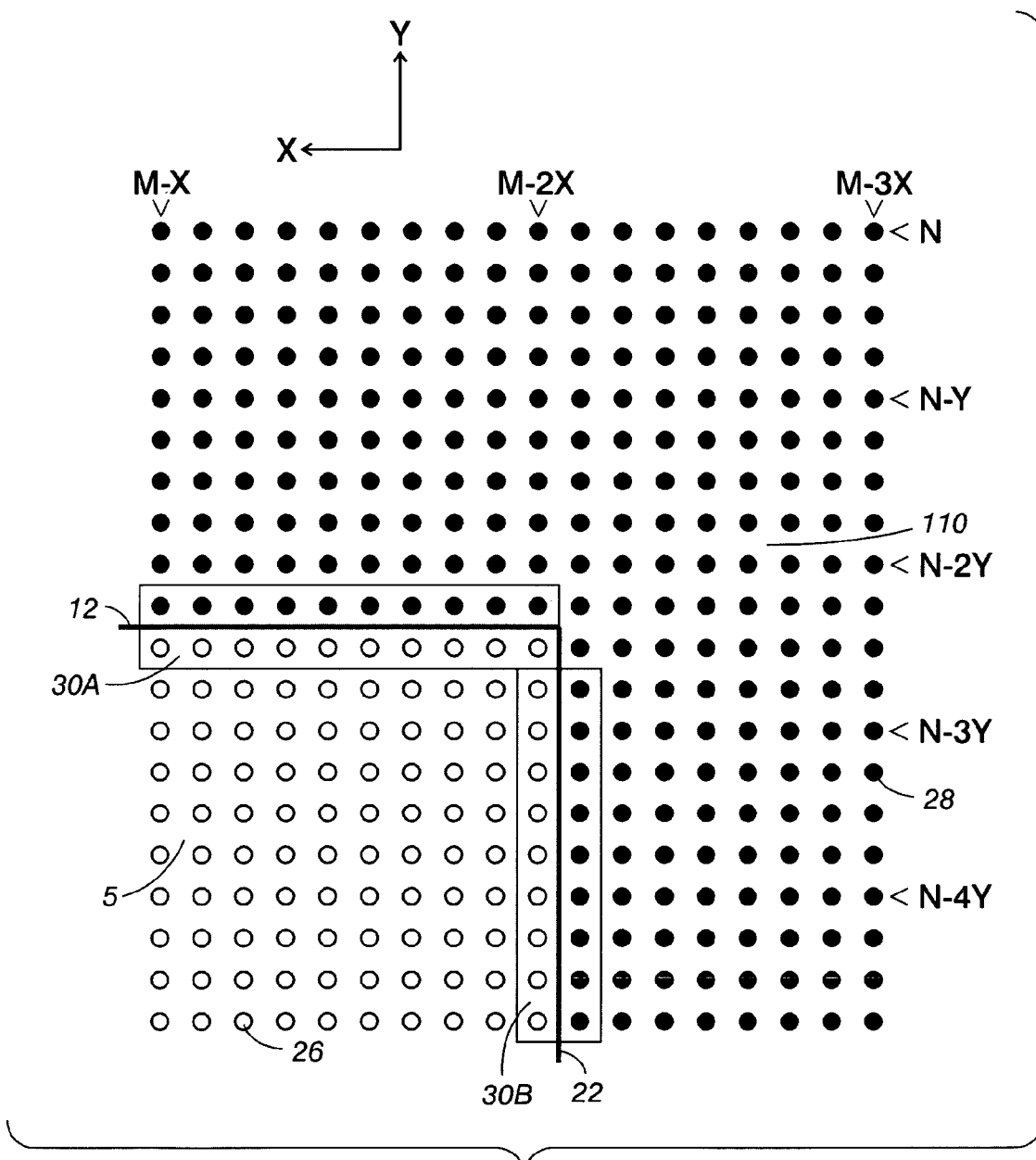
FIG. 5 is a diagram of scan image that represents an input document positioned in a scan area.

As shown in FIG. 5, grayscale image data for scan image 20 represents input document 5 (shown with white pixels 26) and backing roll 106 (shown with black pixels 28). Transition regions 30A and 30B overlay both input document 5 and backing roll 106. In the example shown, transition region 30A includes white pixels 26 and adjacently positioned black pixels 28 from Lead Edge 12 and transition region 30B includes white pixels 26 and adjacently positioned black pixels 28 from Left Edge 22.

Generally, Lead Edge 12 and Trail Edge 14, i.e., the edges that are aligned with fast-scan direction X, are detected by identifying transitions between document image 18 and backing roll 106 in the slow-scan direction. In other words, Slow Scan Processor 210 analyzes pixels that are aligned in the slow-scan direction (i.e., columns) to identify locations where a change in the gray level properties of scan image 20 indicates that there is a transition between document image 18 and backing roll 106. More specifically, Slow Scan Processor 210 identifies pixels that are aligned in the same column where the difference in grayscale value exceeds a threshold amount.

The operation of Slow Scan Processor 210 is described in detail with reference to FIG. 6. In one aspect, Lead Edge Detector 212 samples the slow-scan transition data as it is generated by Slow Scan Processor 210 and records background-to-medium transition points every $x^{th}$ pixel across fast-scan direction X. In one aspect, the background-to-medium transition point for each respective interval is identified as the first location where the difference in grayscale value exceeds the identified threshold. Similarly, Trail Edge Detector 214 samples the captured grayscale image data 102 and records medium-to-background transition points in fast-scan direction X every $x^{th}$ pixel. In one aspect, the medium-to-background transition point for each respective interval is identified as the last location where the difference in grayscale value exceeds the identified threshold.

While the present systems and methods are described as including Lead Edge Detector 212 and Trail Edge Detector 214 that record sampled data, it is understood, that sampling will typically be performed to reduce the amount of hardware that will be required for a given system. Accordingly, it is possible to instead record all of the data and even when sampled data is used, samples need not be recorded at any particular interval.

Figure 6:
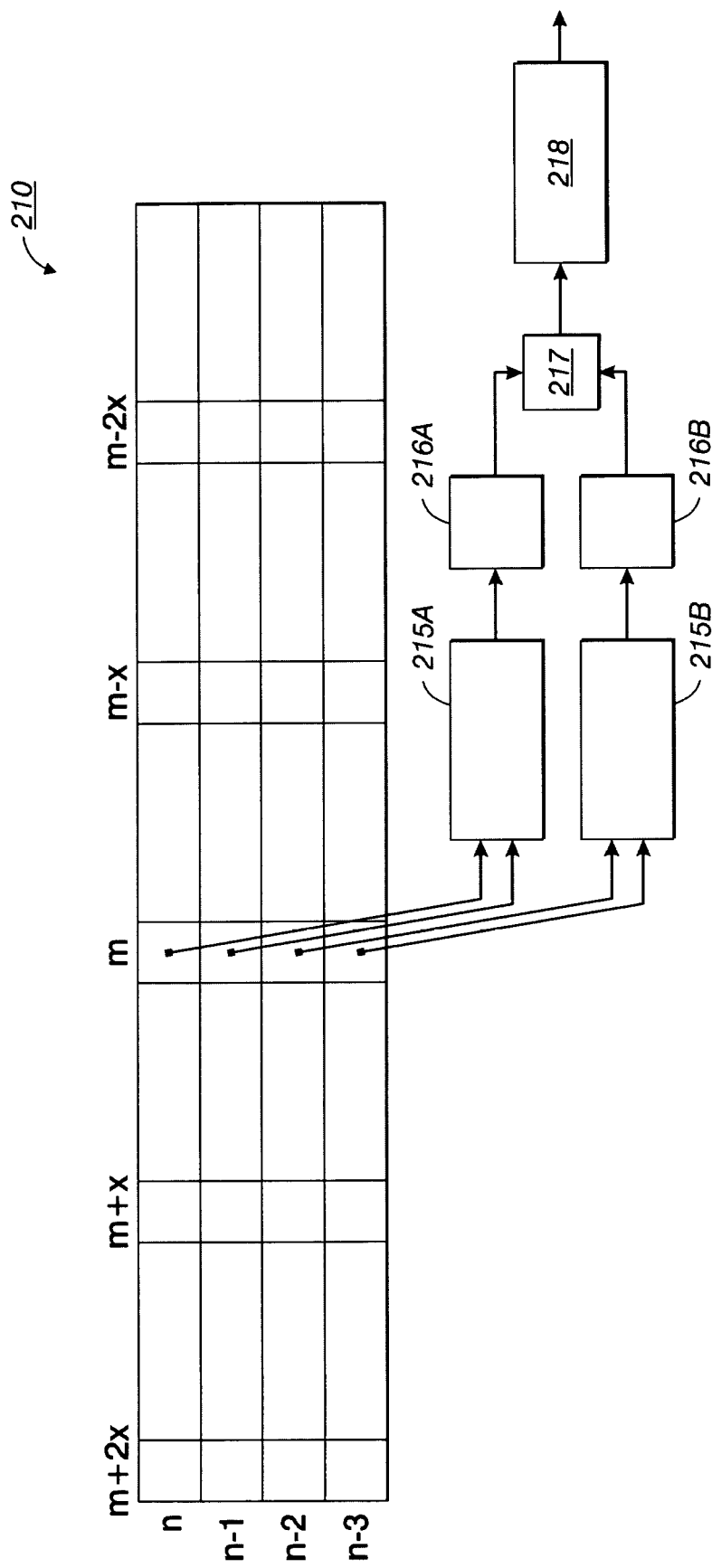
FIG. 6 is an illustration showing operation of a Slow Scan Processor.

In the example of FIG. 6, scanline n (which are the current target of the processing analysis) are currently being recorded, scanline n−1 was recorded immediately prior to scanline n, scanline n−2 was recorded immediately prior to scanline n−1 and scanline n−3 was recorded immediately prior to scanline n−2. In the example of FIG. 6, samples have been taken at x pixel intervals, with the first being taken at pixel m−2x, the next at interval m−x, the third at interval m and the last two at intervals m+x and m+2x, respectively.

For each interval, samples are collected as indicated at blocks 215A and 215B and the grayscale values for pixels in consecutive scanlines are averaged as indicated in blocks 216A and 216B. The difference between the two averages is obtained at block 217 and compared to a programmable threshold at block 218. If the difference exceeds the threshold, the target pixel in scanline n is identified as a transition point.

Figure 7:
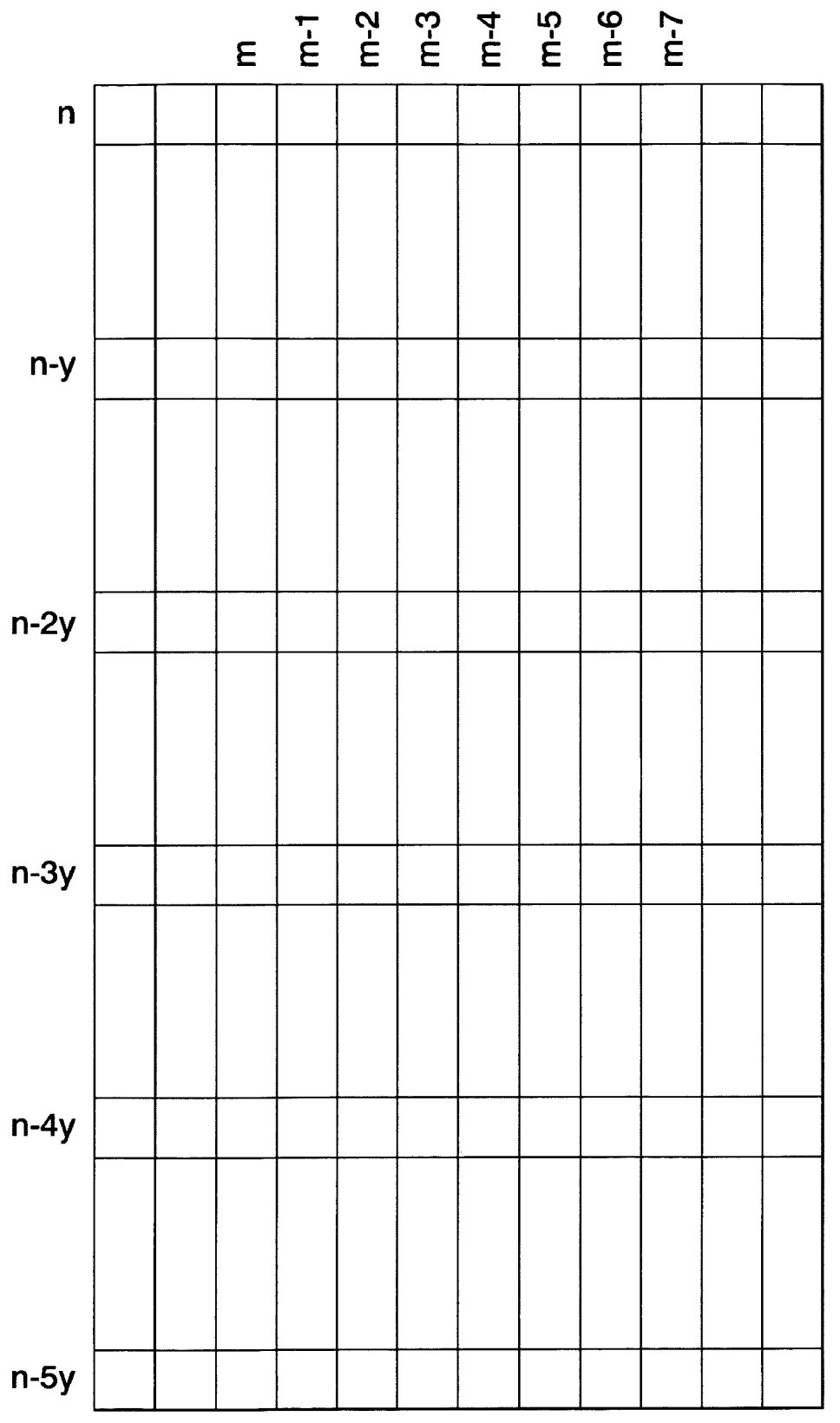

The operation of Fast Scan Processor 220 is similar to that of Slow Scan Processor 210, the difference being that processing takes place in the fast-scan direction. Thus, Fast Scan Processor 220 analyzes the captured document image 18 and identifies pixels that lie at the transition between document image 18 and backing roll 106. However, Fast Scan Processor 220 detects Left Edge 22 and Right Edge 24, i.e., the edges that are aligned with slow-scan direction Y, and thus, transitions between document image 18 and backing roll 106 in the fast-scan direction are identified. Thus, Fast Scan Processor 220 searches for large grayscale transitions between adjacent pixels within a scanline, rather than between pixels in consecutive scanlines that are aligned in the same column. As shown in FIG. 7, sampled fast-scan transition data can be recorded by a Side Edge Detector 222 as it is generated by Fast Scan Processor 220 and record transition points every $y^{th}$ pixel along slow-scan direction Y. As before, the data may be sampled.

The operation of Fast Scan Processor 220 is described in detail with reference to FIG. 8. In one aspect, fast-scan direction transition points are identified by processing segments 224 of pixels that are captured in each scanline. In one aspect, the average grayscale value for pixel segment 224 is obtained at block 501 and the grayscale value difference for pixel segment 224 is obtained at block 503. Fast Scan Processor 220 then determines whether pixel segment 224 is at a location that corresponds to the edge of scan image 20 by comparing the averages and differences to selected threshold values.

More specifically, pixel segments 224 that have grayscale values corresponding to backing roll 106 are identified by comparing the average grayscale value for pixel segment 224 (obtained at block 501) to threshold value $t_3$ at block 505. Pixel segments 224 that have grayscale values corresponding to input document 5 are identified by comparing the average grayscale value to threshold value $t_4$ at block 507. For example, if the grayscale values for scan image 20 represent a white input document 5 and a black backing roll 106, $t_3$ can be set low enough to identify black pixels and $t_4$ can be set high enough to identify white pixels. Thus, the grayscale value average will only exceed $t_4$ when pixel block 224 is composed primarily of white pixels, which means it corresponds to input document 5, and it will be less than $t_3$ when pixel segment 224 is composed primarily of black pixels, which means it corresponds to backing roll 106. Transition points that are identified by Fast Scan Processor 220 are recorded by Side Edge Detector 222 as they are captured.

Figure 8:
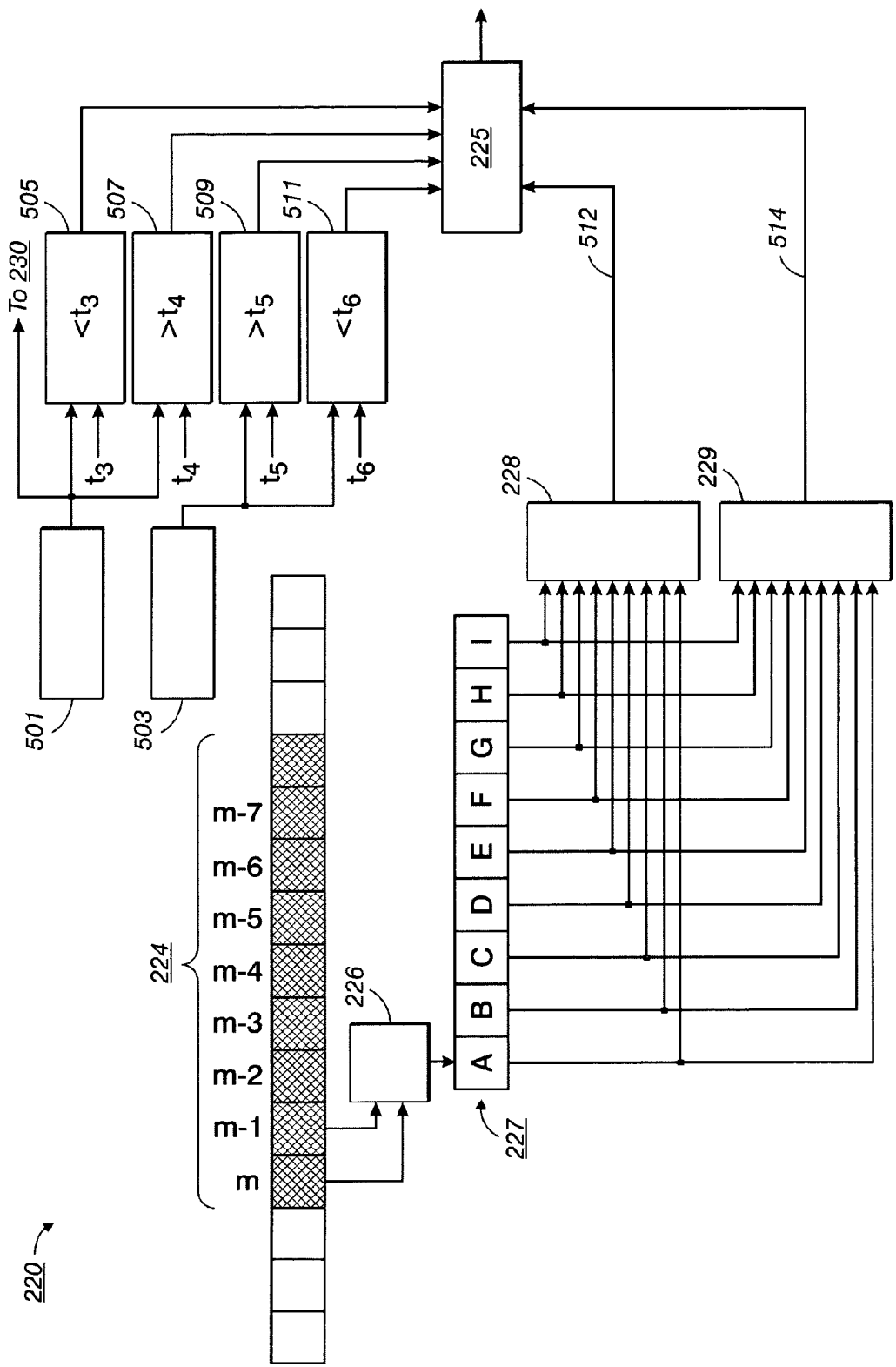
FIG. 8 is a flow diagram showing operation of a Fast Scan Processor.

Still referring to FIG. 8, pixel segments 224 that are at the edges of document image 18 will include both black and white pixels and thus, the average grayscale value for those pixel segments 224 will exceed $t_3$, but be less than $t_4$. The first and last pixel segments 224 in each scanline that meet this criteria provide a rough estimate of the location of Left Edge 22 and Right Edge 24 of document image 18. Notably, pixel segments 224 that lie at the true edges of document image 18 will have approximately equal numbers of black and white pixels. The difference in grayscale value will be highest at these locations, which enables the grayscale value difference for pixel segment 224 to help to identify Left Edge 22 and Right Edge 24.

In the example provided above, the grayscale value for pixels that represent backing roll 106, which are black, is 0 and the grayscale value for pixels that represent input document 5, which are white, is 255. If each pixel segment 224 includes eight pixels, in a pixel segment 224 where most recently captured pixel is white and all of the previously captured pixels are black (i.e., a potential background-to-medium transition), the difference (255+0+0+0)−(0+0+0+0)÷4=63.75. If the four most recently captured pixel are white and the first four are black, the difference increases to (255+255+255+255)−(0+0+0+0)÷4=255. The difference values for pixels that mirror the described example (i.e., similar grayscale data at medium-to-background transitions, where the most recently captured pixels are black) would have the same magnitude, but the opposite sign.

Still referring to FIG. 8, the final determination of the location of Left Edge 22 can be determined by comparing the grayscale difference for pixel segment 224 to threshold $t_5$ at block 509. The location where the grayscale value increases the most is presumed to be Left Edge 22. Right Edge 24 can be identified similarly, from a comparison of the grayscale value difference for each pixel segment 224 to threshold $t_6$ at block 511, in which case the location where the grayscale value decreases the most is presumed to be Right Edge 24.

Fast Scan Processor 220 further refines the average and difference comparisons for the final determination of the locations for Left Edge 22 and Right Edge 24. In one aspect, the differences between the grayscale values for adjacent pixels in a scanline are entered into an array 227. In the example of FIG. 8, the difference in grayscale value between pixel m−1 and pixel m is obtained at block 226 and stored in block 227A, the difference in grayscale value between pixel m−2 and pixel m−1 is obtained at block 226 and stored in block 227B, the difference in grayscale value between pixel m−3 and pixel m−2 is obtained at block 226 and stored in block 227C, etc.

The values that are stored in array 227 are then sorted at blocks 228 and 229 and the locations where the differences in grayscale value between adjacent pixels are the minimum and maximum values are identified. In other words, array 227 is used to distinguish locations where the grayscale difference is maximized, which means a white and black pixel are adjacent and thus, the location corresponds to an edge, from locations where the grayscale difference is minimized, which adjacent pixels have the same color and thus, the location corresponds to either document image 18 (adjacent white pixels) or backing roll 106 (adjacent black pixels). Accordingly, the minimum and maximum grayscale differences can be forwarded to Fast Scan Post Processor 226 along with the output of threshold comparison blocks 505, 507, 509 and 511 for use in making the final determinations of the locations of Left Edge 22 and Right Edge 24.

It is noted that Lead Edge Detector 212, Trail Edge Detector 214 and Side Edge Detector 222 will typically perform additional calculations as samples are recorded, which will be used by Output Processor 280 to finally determine the locations for Lead Edge 12, Trail Edge 14, Left Edge 22 and Right Edge 24. Example of such functions include recording the coordinates of identified transition points, performing linear regression to identify the line of pixels that correspond to an edge, etc.

Figure 9:
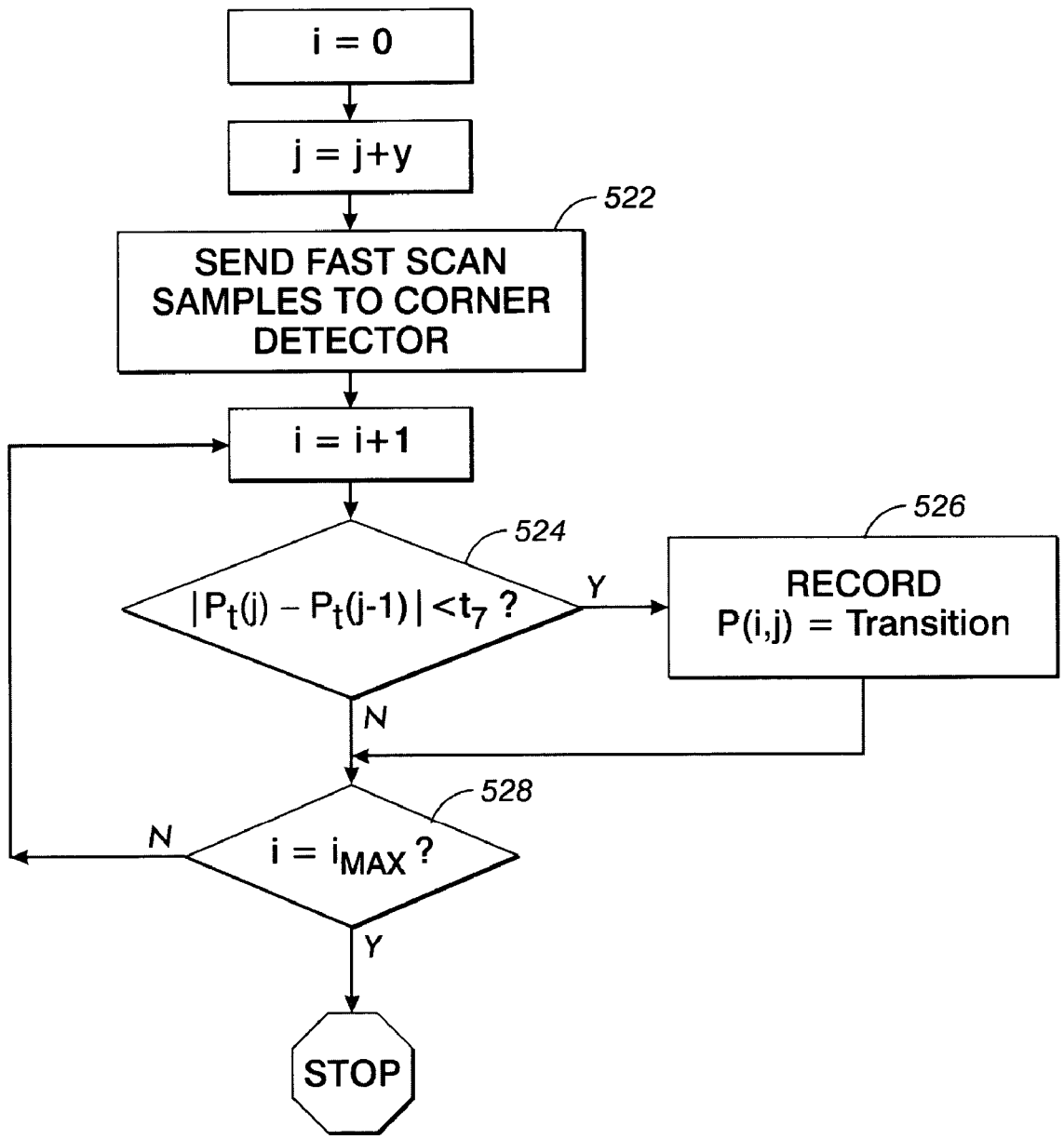
FIG. 9 is a flow diagram view showing operation of a Corner Detector.

As stated earlier, Fast Scan Processor 220 also generates output that can be used to independently detect the two corners 16 of Lead Edge 12. FIG. 9 is a detailed view of a section of scan image 20 that includes a corner 16 of document image 18. The example illustrated shows the corner that intersects Lead Edge 12 and Left Edge 22. However, it is understood that the other corners of document image 18 are arranged in similar fashion. As shown, corner pixel 16 lies adjacent to both transition region 30A and transition region 30B.

As explained earlier, transition regions 30 are locations where there are large variations in the grayscale value for adjacent pixels. In particular, Lead Edge 12 is found at a transition region 30 where a scanline with all black pixels is captured immediately prior to a scanline that includes white pixels. In one aspect, to locate corners 16 of Lead Edge 12, several consecutive scanlines that are identified by Fast Scan Processor 220 as having Left Edge 22 and Right Edge 24 transitions are processed for corner detection.

Figure 10:
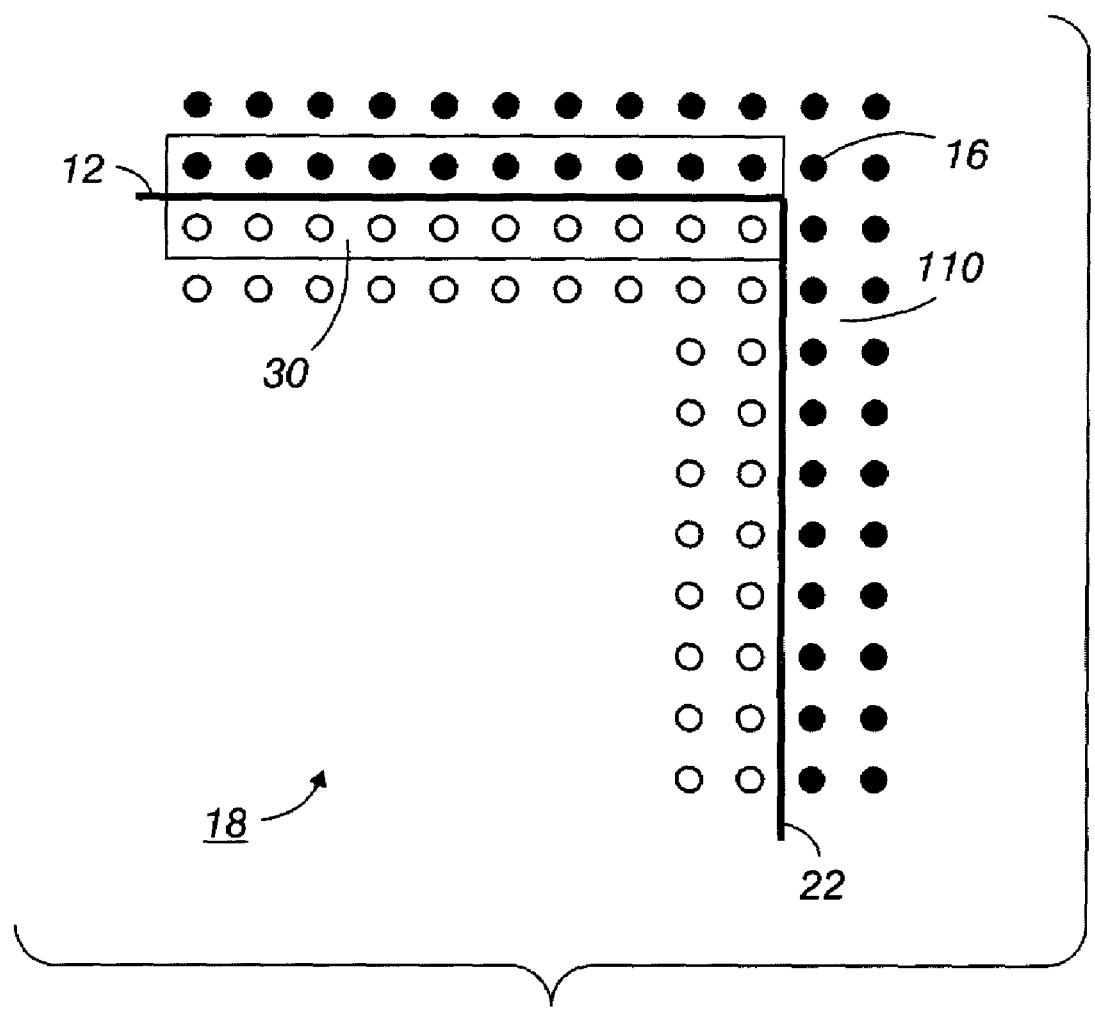
FIG. 10 is a detailed view showing a section of a scan image that includes a corner of a document image.

Turning to FIG. 10, the fast-scan direction transition points in consecutive scanlines that are identified by Fast Scan Processor 220 are forwarded to Corner Detector 250 at block 522. As each scanline is received, the fast-scan direction coordinates for its left and right side transition points are compared to those for the immediately preceding scanline as shown by block 524. As scan image 20 is initially captured, some scanlines will not have any transition points, while others will have transition points that correspond to miscellaneous scanner hardware. These transition points will be in fairly random locations. Once RIS 100 begins to capture input document 5, however, the transition points will rapidly become aligned. In particular, Left Edge 12 and Right Edge 14 transition points will rapidly become aligned in the slow-scan direction. Accordingly, a transition point that is being analyzed can be identified as a corner if the corresponding transition point in the next scanline is displaced in the slow-scan direction by less than a predefined threshold. It will be appreciated that a similar process can be used to identify corners 16 of Trail Edge 14.

The principles of the present system and method are generally applicable to any application that uses the slope of one or more document edges or the skew angle of a document. Furthermore, it should be understood that the principles of the present system and method are applicable to a very wide range of apparatus, for example, copiers, facsimile machine, printers, scanners, and multifunction devices and that they are useful in machines that reproduce black and white and color images by depositing ink, toner and similar marking materials.

Although the present system and method has been described with reference to specific embodiments, it is not intended to be limited thereto. Rather, those having ordinary skill in the art will recognize that variations and modifications, including equivalents, substantial equivalents, similar equivalents, and the like may be made therein which are within the spirit of the invention and within the scope of the claims.

What is claimed is:

1. A digital imaging system, comprising:
    a digital image capture device configured to generate a scan image that digitally represents an input document positioned in a scan area;
    an image processor configured to receive and process said scan image in real-time, wherein said image processor includes an input document edge detection system, an input document corner detection system, an input document skew calculation system and an input document shear calculation system; and
    an output processor configured to provide registration information for said input document,
    said input document edge detection system further comprising:
    a slow scan processor electronically linked to a lead edge detector and a trail edge detector, said lead edge detector being configured to detect a scan image scanline corresponding to an input document lead edge and said trail edge detector being configured to detect a scan image scanline corresponding to an input document trail edge; and
    a fast scan processor electronically linked to a side edge detector and configured to detect a scan image scanline corresponding to an input document left edge and to detect a scan image scanline corresponding to an input document right edge.

2. A digital imaging system as claimed in claim 1, wherein said registration information relates to an input document skew amount.

3. A digital imaging system as claimed in claim 1, wherein said registration information relates to an input document shear amount.

4. A digital imaging system as claimed in claim 1, wherein said registration information relates to an input document paper size.

5. A digital imaging system, comprising:
a digital image capture device configured to generate a scan image that digitally represents an input document positioned in a scan area;
an image processor configured to receive and process said scan image in real-time, wherein said image processor includes an input document edge detection system, an input document corner detection system, an input document skew calculation system and an input document shear calculation system; and
an output processor configured to provide registration information for said input document,
said input document corner detection system further comprising a corner pixel detector electronically linked to said fast scan processor and configured to identify pixels of said scan image that correspond to an input document corner, said input document corner pixel detection being independent of an output of said side edge detector.

6. A digital imaging system, comprising:
a digital image capture device configured to generate a scan image that digitally represents an input document positioned in a scan area;
an image processor configured to receive and process said scan image in real-time, wherein said image processor includes an input document edge detection system, an input document corner detection system, an input document skew calculation system and an input document shear calculation system; and
an output processor configured to provide registration information for said input document;
said input document skew calculation system further comprising:
a line calculator configured to calculate a skew angle and shear amount for pixels of said scan image that correspond to said input document based upon an output of said edge detection system; and
a corner processor configured to locate at least one pixel of said scan image that corresponds to a corner of said input document based upon said edge detection system output.

7. A digital imaging system, comprising:
a digital image capture device configured to generate a scan image that digitally represents an input document positioned in a scan area;
an image processor configured to receive and process said scan image in real-time, wherein said image processor includes an input document edge detection system, an input document corner detection system, an input document skew calculation system and an input document shear calculation system; and
an output processor configured to provide registration information for said input document;
a paper start detector electronically linked to said input document edge detection system and configured to identify pixels of said scan image that correspond to a first captured portion of said input document; and
a detection range controller electronically linked to said paper start detector and configured to limit an image processing operation to a predefined portion of said scan image.

8. A method, comprising:
Receiving a scan image that digitally represents an input document positioned in a scan area; and
operating an image processor to detect a fast-scan direction aligned input document edge by (i) obtaining a first grayscale average for a scan image target pixel and a pixel aligned with said target pixel in a slow-scan direction in a first previously processed scanline, (ii) obtaining a second grayscale average for pixels that are aligned with said target pixel in a slow-scan direction in at least a second and third previously processed scanline, (iii) obtaining a difference between said first grayscale average and said second grayscale average; (iv) obtaining a grayscale difference threshold that distinguishes background pixels and input document pixels and (v) designating said target pixel as a slow-scan transition pixel if said first and second grayscale average difference exceeds said grayscale difference threshold.

9. A method as claimed in claim 8 further comprising:
detecting a slow-scan direction aligned input document edge by (i) identifying a pixel segment of a scan image scanline; (ii) obtaining an average grayscale value for said scanline pixel segment; (iii) obtaining a grayscale value difference for said scanline pixel segment; (iv) obtaining a grayscale difference threshold that identifies a background-to-medium pixel; (v) obtaining a grayscale difference threshold that identifies a medium-to-background pixel; (vi) comparing said pixel segment average grayscale value to an input document threshold; (vii) comparing said scanline pixel segment average to a background image threshold; and (viii) identifying a first pixel segment in said scanline with a grayscale value average between said input document threshold and said background image threshold as a background-to-medium transition pixel; and (ix) identifying a last pixel segment in said scanline with a grayscale value average between said input document threshold and said background image threshold as a medium-to-background transition pixel.

10. A method as claimed in claim 9 further comprising:
comparing said scanline pixel segment difference to a background-to-medium threshold; comparing said scanline pixel segment difference to a medium-to-background threshold; and forwarding an output from said background-to-medium threshold comparison output and said medium-to-background threshold comparison output to a fast scan direction post processor for final determination of said left and right edge locations background-to-medium threshold.

11. A method as claimed in claim 10 further comprising entering grayscale difference values for adjacent pixels of a scanline into an array; and sorting said array to identify a scanline maximum grayscale value and a scanline minimum grayscale value.

12. A method as claimed in claim 8 further comprising detecting scan image scanlines corresponding to at least a lead edge and a trail edge of said input document.

* * * * *

UNITED STATES PATENT AND TRADEMARK OFFICE
CERTIFICATE OF CORRECTION

PATENT NO.        : 7,515,772 B2
APPLICATION NO. : 11/028394
DATED              : April 7, 2009
INVENTOR(S)      : Xing Li et al.

It is certified that error appears in the above-identified patent and that said Letters Patent is hereby corrected as shown below:

Title Page, insert
--(73) Assignee: Xerox Corporation, Norwalk, CT (US)--.

Signed and Sealed this

First Day of September, 2009

David J. Kappos
*Director of the United States Patent and Trademark Office*